UNITED STATES PATENT OFFICE.

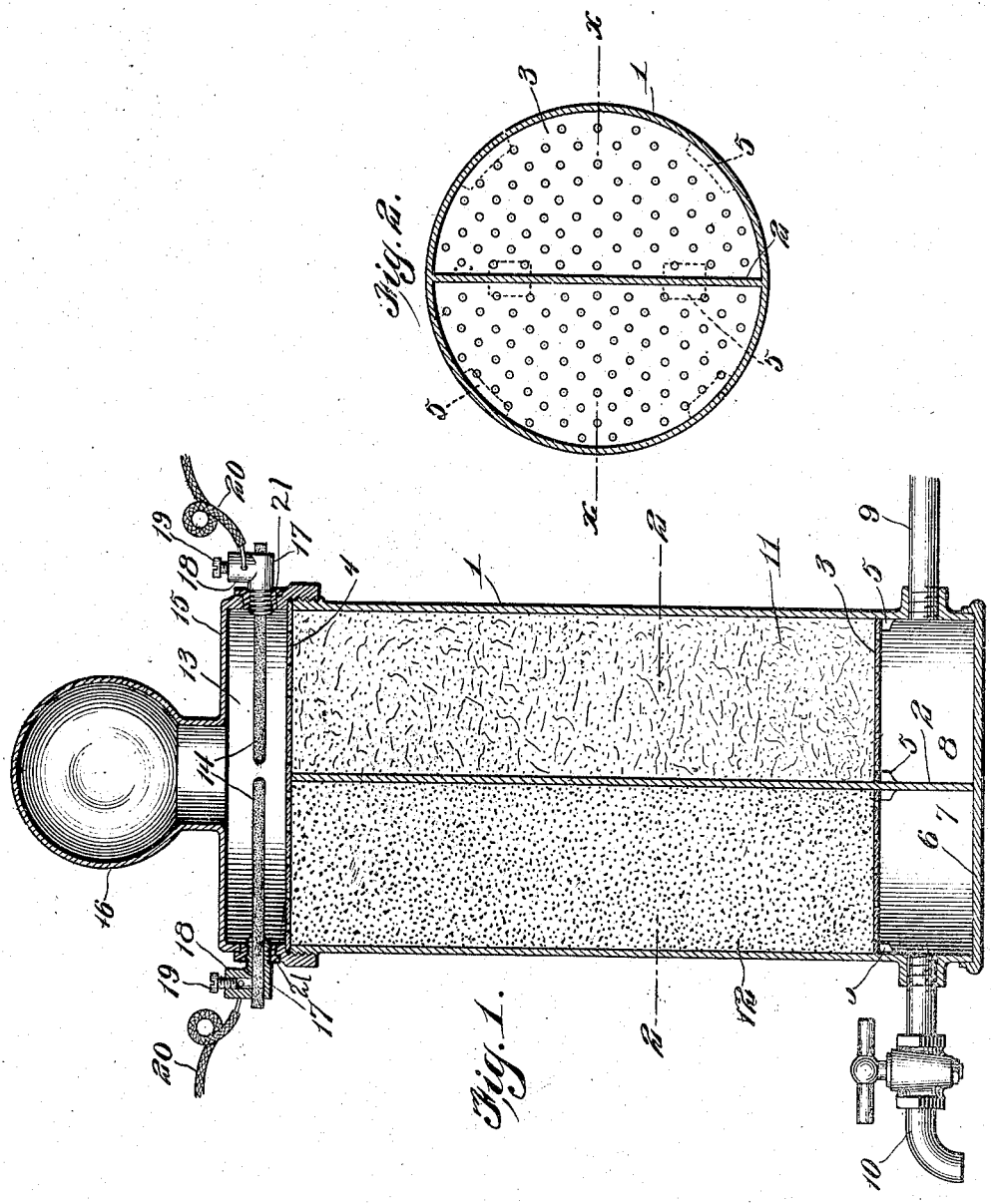

MATHEW R. FREI, OF KANSAS CITY, MISSOURI.

ELECTRIC WATER-PURIFIER.

936,993.  Specification of Letters Patent.  Patented Oct. 12, 1909.

Application filed May 1, 1909. Serial No. 493,394.

*To all whom it may concern:*

Be it known that I, MATHEW R. FREI, a citizen of the United States, residing at Kansas City, in the county of Jackson and State of Missouri, have invented new and useful Improvements in Electric Water-Purifiers, of which the following is a specification.

The purpose of the present invention is to devise means for purifying and sterilizing water for drinking and domestic purposes generally.

The invention has for its object to supply means for the purification of water both by filtering and by electrolysis the latter serving to destroy all living organisms and bacilli whereas the filtering removes all foreign matter from the water.

The invention consists of a receptacle subdivided into a plurality of chambers or compartments, one of said chambers containing electrodes by means of which purification by electrolysis is effected electrically, and certain other compartments or chambers containing filtering material for purifying the water by physical action in the manner well understood.

The invention consists of the novel features details of construction and combinations of parts which hereinafter will be more particularly set forth illustrated in the drawings hereto attached and finally claimed.

Referring to the drawings forming a part of the specification, Figure 1 is a vertical central section of a water purifying apparatus embodying the invention. Fig. 2 is a horizontal section thereof on the line 2—2 of Fig. 1, the inflow and the outflow pipes being omitted.

The receptacle 1 may be of any construction and capacity depending upon the special use and adaptation of the apparatus. A partition 2 subdivides the receptacle into vertical compartments or chambers in each of which filtering material is placed. Perforated plates 3 are supported in the chambers or compartments formed by the partition 2 and sustain the filtering material. A plate 4 closes the upper ends of said chambers or compartments and is supported upon the partition 2 and upon the upper end of the receptacle 1. This plate 4 is likewise perforated to provide for a free passage of the water during the purifying process. The plates 3 are supported upon lugs 5 extended inward from the partition 2 and the walls of the receptacle 1. The partition 2 extends to the bottom 6 of the receptacle and is jointed at its vertical edges with inner walls of the receptacle at diametrically opposite points. The supporting plates 3 are elevated a distance from the bottom 6 of the receptacle and the space between the bottom 6 and the said plates 3 is divided by the partition 2 into chambers 7 and 8 the latter having connection with the inlet and the former with the outlet. The inflow pipe 9 may connect with any source of supply for the water to be purified and connects with a boss or coupling provided at a side of the receptacle opposite the chamber 8. A faucet 10 for drawing off the purified water connects with a boss or coupling provided upon a side of the receptacle in communication with the chamber 7.

The chamber 11 formed upon one side of the partition 2 is adapted to receive fibrous filtering material of any nature such as fresh filtering pulp, mineral wool charcoal or the like. The chamber 12 provided upon the opposite side of the partition 2 is adapted to receive granular filtering material such as sand or fine gravel. The two filtering media by reason of their different physical characteristics insure a thorough separation of impurities from the water during the passage of the latter through the apparatus.

An electrolyzing chamber 13 is provided at the upper end of the receptacle 1 above the filtering chambers and is common to the latter and contains the electrodes 14 which are included in an electric circuit whereby in the operation of the apparatus the water in its passage through the appliance is subjected to electrolysis which insures destruction of organisms and effects sterilization and an elimination of bacilli of every nature. The electrodes 14 have adjustable connection with the structure inclosing the chamber 13 so as to very the effects as may be required. The electrodes may be of any conducting material best adapted for the purpose.

The chamber 13 is inclosed by means of a cap 15 which is threaded to the upper end of the receptacle 1 and is formed with an inner shoulder to overlap the perforated plate 4 and retain the latter in place. A dome 16 surmounts the cap 15 and constitutes a reservoir to contain a quantity of water. The dome 16 is centrally disposed hence the water in its circulation is compelled to pass the electrodes twice, once in its upward ascent in the dome and secondly by its descent of said dome into the chamber 12 preliminarily in its passage through the faucet 10. The dome 16 and cap 15 may be of integral or separate formation as may be found most desirable according to the size or capacity of the purifying apparatus.

Each electrode is supported by means of a holder the latter consisting of a sleeve 17 set in the rim of the cap and receiving the electrode which is adjustable therein, the electrode being insertible in or removable through the outer end of the sleeve without necessitating the removal of the latter from the cap. A hollow stud 18 is provided at one side of the sleeve 17 and is internally threaded to receive a set screw 19 by means of which the electric wire 20 is retained in place, the end of said wire being inserted in the opening extending laterally through the stud and intersecting with the opening thereof. A bushing 21 of insulating material is interposed between each of the sleeves 17 and the rim of the cap to prevent short circuiting of the electrodes 14.

In the practical operation of the apparatus, it being assumed that the parts are assembled substantially in the manner illustrated, the water to be purified enters the chamber 8 thence passes upwardly through the filtering material in the chamber 11 and enters the electrolyzing chamber 13 in which it is subjected to the action of an electric current passing between the electrodes 14. The water passes upward from the electrolyzing chamber 13 into the dome or reservoir 16 thence downward again into the electrolyzing chamber and through the filtering material into the chamber 12 into the chamber 7 and when the faucet 10 is open the purified water is drawn off therethrough from the chamber 7.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Claims.

1. An apparatus for purifying water the same comprising a receptacle subdivided by means of a vertical partition into chambers, perforated plates supported within the lower portions of said chambers a short distance above the bottom of the receptacle, fibrous filtering material in one of said chambers granular filtering material in the other chamber, a perforated plate covering said chambers, means for supplying water to the space upon one side of said partition below the filtering material, means for drawing off water from the space upon the opposite side of the partition below the other filtering material, a cap fitted to the upper end of the receptacle and inclosing an electrolyzing chamber, electrodes extended into said electrolyzing chamber and a reservoir surmounting said cap and in communication with the electrolyzing chamber.

2. The herein described water purifier comprising a receptacle, a vertical partition subdividing the receptacle into chambers, the one having an inlet at its lower end and the other an outlet, perforated plates supported within said chambers a short distance above the bottom of the receptacle, fibrous filtering material in one of said chambers, granular filtering material in the other chamber, a perforated plate closing the upper ends of said chambers and confining the filtering material therein, a cap secured to the upper end of the receptacle and inclosing an electrolyzing chamber and serving as securing means for the upper perforated plate, electrodes extended into the electrolyzing chamber, holders fitted to opposite sides of the cap and supporting said electrodes and adapted to have the electric conductors attached thereto and a centrally disposed reservoir surmounting said cap.

In testimony whereof I affix my signature in presence of two witnesses.

MATHEW R. FREI.

Witnesses:
 I. STEINKORST,
 SHARLENE L. SWEET.